United States Patent
Mathiesen et al.

(10) Patent No.: US 7,881,816 B2
(45) Date of Patent: Feb. 1, 2011

(54) METHOD FOR CONTROLLING AN INDUSTRIAL AUTOMATION DEVICE

(75) Inventors: Mogens Mathiesen, Oslo (NO); Niels Aakvaag, Oslo (NO); Gilles Thonet, Meylan (FR)

(73) Assignee: ABB Research Ltd., Zürich (CH)

( * ) Notice: Subject to any disclaimer, the term of this patent is extended or adjusted under 35 U.S.C. 154(b) by 571 days.

(21) Appl. No.: 11/793,387

(22) PCT Filed: Dec. 19, 2005

(86) PCT No.: PCT/IB2005/003816

§ 371 (c)(1),
(2), (4) Date: May 2, 2008

(87) PCT Pub. No.: WO2006/064362

PCT Pub. Date: Jun. 22, 2006

(65) Prior Publication Data

US 2009/0043407 A1    Feb. 12, 2009

Related U.S. Application Data

(60) Provisional application No. 60/636,694, filed on Dec. 17, 2004.

(51) Int. Cl.
*G05B 13/02* (2006.01)
*G05B 11/01* (2006.01)
*G05B 15/00* (2006.01)
*G05B 23/02* (2006.01)
*G08B 5/22* (2006.01)

(52) U.S. Cl. ............... 700/47; 700/17; 700/19; 700/48; 700/51; 700/83; 340/3.1; 340/825.29

(58) Field of Classification Search ............ 700/1, 700/17, 19–20, 47–48, 51–52, 83; 340/3.1, 340/825.29
See application file for complete search history.

(56) References Cited

U.S. PATENT DOCUMENTS

| 4,345,194 | A | * | 8/1982 | Green ............... 318/621 |
| 4,503,310 | A | * | 3/1985 | van Loon ............ 219/98 |
| 4,546,426 | A | * | 10/1985 | Hafner et al. ......... 700/33 |
| 6,021,418 | A | * | 2/2000 | Brandt et al. ........ 715/205 |

(Continued)

FOREIGN PATENT DOCUMENTS

EP    1243990 A    9/2002

(Continued)

OTHER PUBLICATIONS

PCT/ISA/210—International Search Report—Mar. 29, 2006.

(Continued)

*Primary Examiner*—Ramesh B Patel
(74) *Attorney, Agent, or Firm*—Venable LLP; Eric J. Franklin (57) ABSTRACT

A method for controlling an industrial automation device or process including a control unit, at least one actuator, and at least one device arranged for wireless communication with the control unit. The method determines characteristics of the wireless transmissions used to communicate sensor and/or actuator data to the control unit. The method, a system and a graphic interface enable a user to select a control strategy dependent on a value or values of the characteristics of the wireless communications.

35 Claims, 5 Drawing Sheets

U.S. PATENT DOCUMENTS

| | | | |
|---|---|---|---|
| 2003/0144746 A1* | 7/2003 | Hsiung et al. | 700/28 |
| 2004/0150667 A1* | 8/2004 | Dove et al. | 345/763 |
| 2004/0158474 A1* | 8/2004 | Karschnia et al. | 705/1 |
| 2005/0143968 A9* | 6/2005 | Odom et al. | 703/21 |
| 2005/0159922 A1* | 7/2005 | Hsiung et al. | 702/182 |
| 2007/0022204 A1* | 1/2007 | Moch et al. | 709/230 |
| 2007/0282781 A1* | 12/2007 | Mathiesen et al. | 707/1 |

FOREIGN PATENT DOCUMENTS

WO     WO-02/13036 A1     2/2002

OTHER PUBLICATIONS

PCT/IPEA/409—International Preliminary Report on Patentability—Sep. 14, 2006.

\* cited by examiner

METHOD FOR CONTROLLING AN INDUSTRIAL AUTOMATION DEVICE

CROSS-REFERENCE TO RELATED APPLICATIONS

This application claims priority to U.S. provisional patent application 60/636,694 filed 17 Dec. 2004 and is the national phase under 35 U.S.C. §371 of PCT/IB2005/003816 filed 19 Dec. 2005.

TECHNICAL FIELD

The present invention concerns a control method and a system for controlling an industrial automation device or industrial process. The invention relates to control systems in which one or more communications are carried out wirelessly for one or more data signals and/or control signals.

TECHNICAL BACKGROUND

Process control for industrial automation processes or industrial automation devices is often supervised and regulated by a process control system such as a closed loop control process. A traditional approach in the use of closed loop control is to measure a value of a process output and compare the measured value with a reference value. There are also other objectives of control loop control, including set-point regulation, tracking (time-varying reference path), path following (varying reference independent of time), disturbance attenuation etc. When used as an input for a in a feedback control loop, any difference between the measured sensor value and the reference signal is fed into the controller. The controller then in turn sends signals to the actuator so that the reference value is approached.

Figure 1:
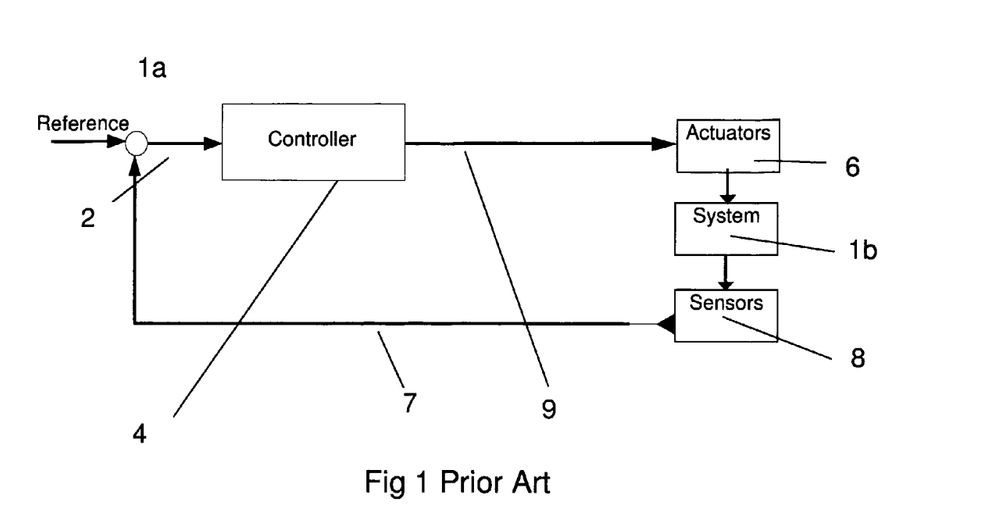
FIG. 1 is a schematic diagram for a control method for closed loop feedback according to the Prior Art.

A control loop from the Prior Art is shown in FIG. 1. The Prior Art is shown to have a comparator 2, a control unit 4, an actuator 6 and a sensor 8. Sensor 8 measures a value for an output of the process, a dimension for example, and the measured value is sent to comparator 2. Comparator 2 compares the measured value with a reference value, sends the result to control unit 4. Control unit 4 issues a control signal to actuator 6 to reduce the difference between the reference value and the measured output value.

Model based control approaches typically use a mathematical or statistical model. An example of model based control may use one or more state equations, of which one may be of the form:

$$\frac{dx}{dt} = f(x, u)$$
$$y = g(x)$$

where x is the vector of all state variables including time derivatives to any order of x,
y is the output vector,
u is a vector of the inputs,
t is time,
f and g are functions representing the system.

Over time the difference between the value of the output measured by sensor 8 is expected to approach zero. Time delays and other constant feedback effects are not modelled in the above model, but may also occur between the actuator and the sensor. Such disturbances are not included in the above exemplary model but would be present in a real system.

The traditional closed loop feedback system comprises hard-wired communication links. A disadvantage with hard-wired communication links is that changes in position of any component in the closed loop, such as a sensor or actuator, usually requires a stop in production or an extensive shutdown, especially in the case of analogue wired connections, and/or digital wired connections. Alternatively, such changes have to be delayed until a process shutdown may be programmed. In addition, hard wiring may be both expensive to replace and sometimes technically challenging to replace.

The addition or removal of components in a control loop may demand interruptions in production or even a shutdown to implement when hard wired control lines are in use.

Wireless communications have been used within industrial systems and standards such as IEEE-802.11 have been shown to be sufficiently robust for many industrial environments. However, wireless communications are more subject to dynamic variations and disturbances than hard-wired or optical networks.

SUMMARY OF THE INVENTION

A primary aim of the present invention is to provide additional information for use in identifying a control strategy to use to control an industrial automation process. A secondary aim of the present invention is to provide additional information for use in identifying a control strategy to use to control an industrial automation device. Another aim is to provide additional information for use in a process control system to better improve control over the process and/or device.

The above and more aims are achieved according to the invention by a method and a system.

According to one aspect of an embodiment of the present invention, a method is provided for controlling an industrial automation device or process comprising a control unit, at least one actuator and at least one device arranged for wireless communication with said control unit of said process, which comprises determining at least one characteristic of a wireless transmission, statistically processing the at least one characteristic and supplying an estimated value for correction to said control unit, and selecting a control strategy dependent on the value or values of the at least one wireless communication characteristic.

According to another aspect of an embodiment of the present invention, a method is provided for controlling an industrial automation device or process by implementing in a control unit of the device or process a control strategy dependent on an optimization of parameters of the communication channel by means of a logical or arithmetic model or process based on any from the list of: rule based model, state estimator, Kalman filter, deductive reasoning.

According to a further other aspect of an embodiment of the present invention, a method is provided for controlling an industrial automation device or process by reading one or more of the characteristics of a wireless communication between a sensor and/or actuator a control unit of the process from a communication layer of the wireless communication.

According to a further other aspect of an embodiment of the present invention, a method is provided for controlling an industrial automation device or process by reading one or more of the characteristics of a wireless communication between a sensor and/or actuator a control unit of the process from a MAC layer (medium access control) and/or a physical layer of the wireless communication.

Closed loop control is often carried out by determining an output value from a process and, depending on the objective comparing the measured or otherwise determined value to a reference value. The difference between the reference signal and the measured sensor value is fed into the controller. The controller then in turn sends signals to the actuator so that the reference value is approached. There are of course several possible objectives of control loop control. Set-point regulation, tracking (time-varying reference path), path following (varying reference independent of time), disturbance attenuation, etc. The quantity to be controlled can be the measured output or state, an unmeasured state, or combinations of measured, unmeasured states and the control variable. In a control system according to the Prior Art, all communication is typically hard-wired, and the quality of communication does not normally become an issue in the absence of extreme conditions and/or damage to wiring. However when one or more communication links are carried out by a wireless means, the quality, and/or robustness of the communication may be a technical concern.

The method according to an embodiment of the present invention concerns monitoring the wireless communication taking place in a controlled process and feeding back information to the controller, which information may be incorporated in a control action, for example by means of the control algorithm. Information that may be included may be dependent, for example, on: packet loss, delay, delay variance. This means that information may be taken directly for example from one or more communication layers, and trends in the communication parameters can also be included. This information can as well be time-varying. In this description the concept of a comparator includes a comparator that identifies the differences between the desired behavior (for example a reference value, a trajectory, trend or path) and that of the system based on the relevant performance criterion. The comparator and the controller block may be comprised in one and the same module.

The principal advantage of the invention is that monitoring of the wireless communication provides additional information that may be used to improve process control, and/or control of one or more industrial automation devices. More information is thus provided to control processes and/or devices without adding dedicated sensors or measuring means, but only by extracting information from existing sources in a new and inventive way, then processing the information, and applying it in a selected way.

In addition, further and advantageous aspects of the invention are described in relation to a graphical user interface, and a computer program for implementing the method and a claim for a computer program product comprising the computer program.

BRIEF DESCRIPTION OF THE DRAWINGS

Embodiments of the invention will now be described, by way of example only, with particular reference to the accompanying drawings in which.

DETAILED DESCRIPTION OF THE EMBODIMENTS

Figure 2:
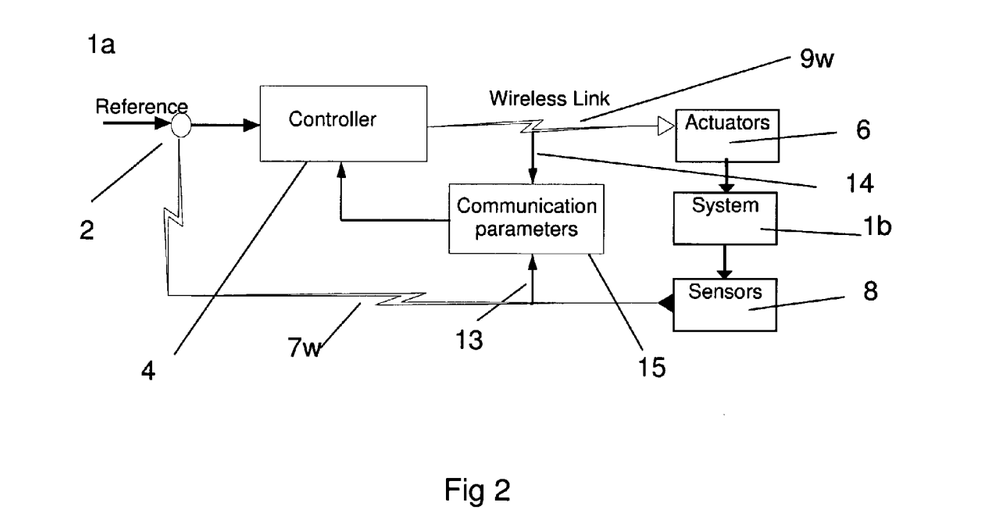
FIG. 2 is a schematic block diagram for a method of controlling an industrial automation device or process by means of one or more control strategies according an embodiment of the invention.
Figure 3:
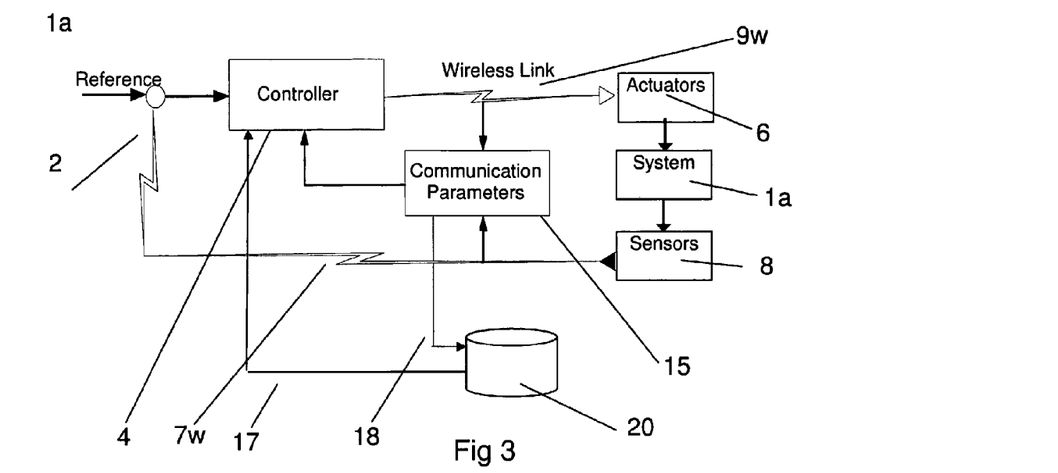
FIG. 3 is a schematic flowchart for a control method for closed loop feedback according another embodiment of the invention.

FIG. 2 shows a schematic diagram for closed loop control of an industrial process including one or more wireless communication links. FIG. 2 shows a closed loop feedback control 1$a$ similar to the Prior Art example shown in FIG. 1. FIG. 2 shows one or more communication links, one link 7$w$ from sensor to control unit 4 and a link 9$w$ between control unit to actuator 6 implemented as wireless links. One or more actuators 6 and one or more sensors 8 may be comprised in a process comprised as system 1$b$ or subsystem Wireless link 7$w$ and/or 9$w$ are monitored and communications parameters collected at 15 are sent to the control unit 4. Wireless link 7$w$, 9$w$ may be monitored and the resulting information sent to control unit 4.

The parameters of the communication channel may be fed back to the controller and included in the control algorithm, for example RSSI (received signal strength indication), network occupancy, packet loss rate, transmission delay, transmission delay variance. For example a control algorithm may comprise a form of model based control using one or more state equations. Parameters of the communication channel may be fed back into a control model which may in this case take the form:

$$\frac{dx}{dt} = f(x, u, c)$$
$$y = g(x)$$
$$c(t) = \begin{bmatrix} c_1(t) \\ c_2(t) \\ \ldots \\ c_k(t) \end{bmatrix}$$

where the vector c consists of k communication elements (parameters) $c_i$.

The communication parameters are monitored by reading information comprised in different ways in the wireless transmissions. Much of the information may be obtained from a MAC (Medium Access Control) layer of, for example, an IEEE 802.11-type protocol for wireless communication in an Ethernet type LAN, or from an IEEE 802.15.4 wireless network system. The information available from such a MAC layer may comprise the following parameters:

RSSI received signal strength indication
number of failed transmission attempts
network occupancy.

Information from such a MAC layer, while limited in its extent, may comprise parameters relevant to any of the following functions such as:

Device discovery
Device service availability +/or classification
Interface to PHY
Delivery of upper layer packets MAC packet encoding/decoding
CSMA/CA handling
FDMA fast access handling
Superframe handling (TDMA)
Interface to DLC/LLC
CRC check Other communication parameters are monitored as such and not read or obtained from the wireless transmission Medium Access Control. These are parameters such as:
transmitter power use variation
receiver power use variation.

Parameters from the immediate environment of the wireless node may be collected for analysis and control purposes. For example an update rate for a wireless sensor, and/or variations in the update rate, may be logged as a parameter and evaluated.

Figure 4:
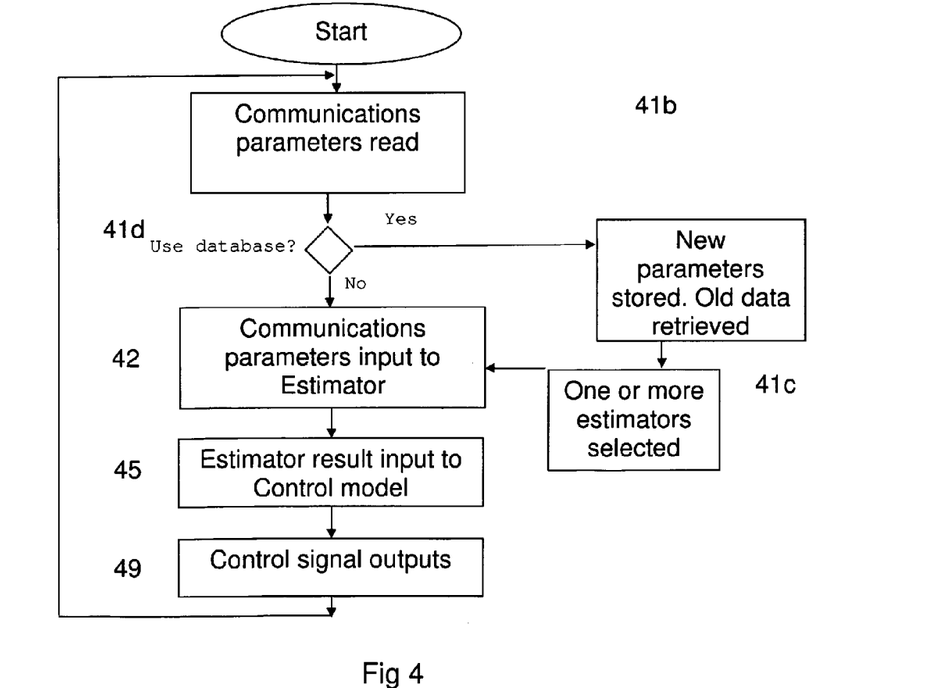
FIG. 4 is a flowchart for steps of a method according another embodiment of the invention

FIG. 4 shows a flowchart for steps of using parameters from wireless communication in a control loop for an industrial process according to one embodiment of the invention. The method may begin at 41 by

41*b* storing retrieved parameter data, and or

Figure 6:
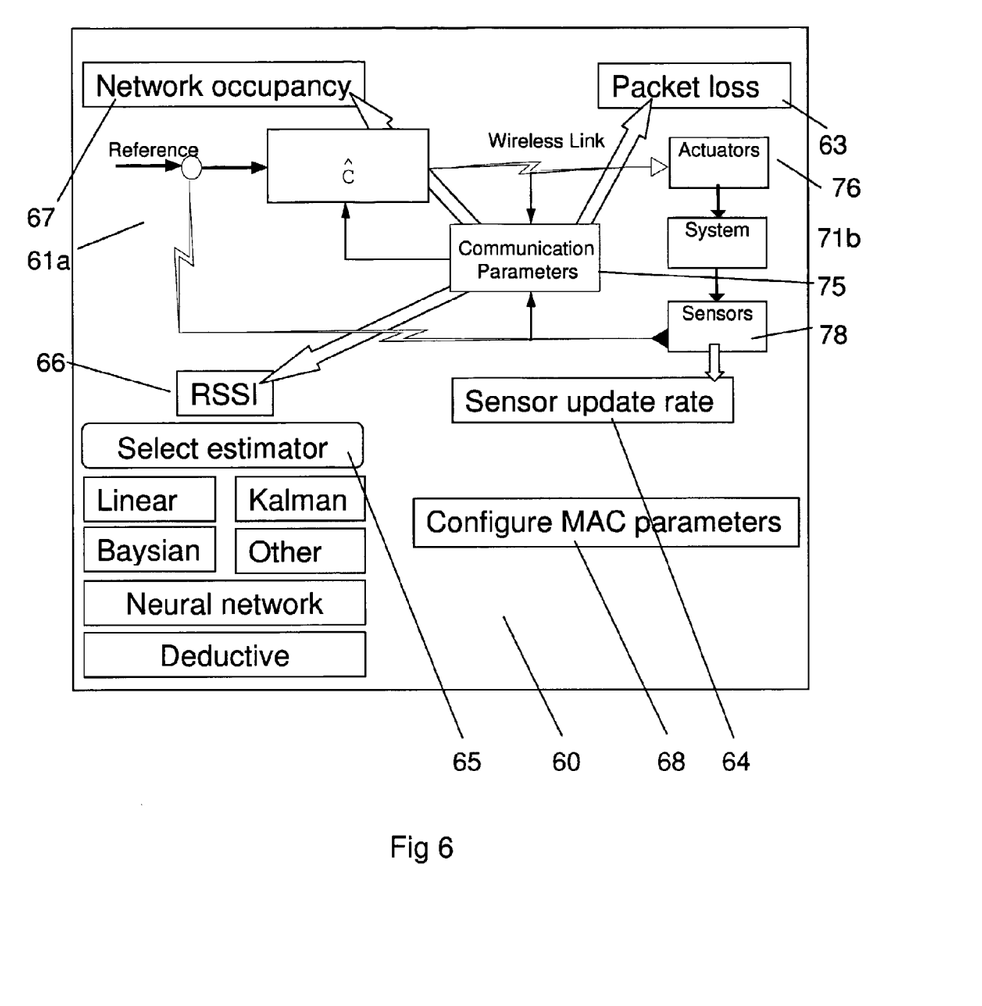
FIG. 6 is a schematic block diagram for a graphical user interface for displaying and/or manipulating methods according to another embodiment of the invention.

41*c* selecting one or more estimators, control strategies, such as for example via 67, FIG. 6, and

41*d* Reading communications parameters, storing them,

42 Inputting communications parameters into an estimator, or recursive data processing algorithm or Kalman filter, or other strategic control model,

45 Outputting the estimator output to a control model,

49 generating, in a controller, control signal outputs.

In this way an estimator or other control strategy may be selected and used to provide a good estimate for a predictive correction in a control loop, the selected control strategy control strategy may be selected and used to provide a good estimate for a predictive correction in a control loop, the selected control strategy depending to some extent on the nature of the information derived from the data gained from the wireless transmission characteristics. Dead reckoning (or deductive reasoning), a Kalman Filter, Neural network or similar may also be used to provide a correction factor for the control loop to identify disturbances and/or to eliminate a process error. Thus control, for example, of an actuator 6 as shown in the schematic control loop of FIG. 2 may be carried out by corrective action based on parameters of wireless communication between the control unit and the actuator and/or by corrective action based on parameters of wireless communication between the control unit and a sensor cooperating with the actuator. A type of rule-based model also may be used.

For the purpose of developing an adaptive estimator, one or more neural networks may also be trained either off line or on line, depending on the situation and the data intensity with respect to data handling capacity, and/or computing requirements. The application of neural networks can as well take place together with the mathematical and/or physical process models, as a relative neural network. As well or instead neural networks may be used to model one or more technical processes or assumed technical processes that have, for example, not been captured in a mathematical and/or physical process model, an application which is sometimes known as absolute neural networks. On-line training of neural networks may be particularly useful when it is relevant to determine a "Monday morning" syndrome, i.e. variation due to a plant re-starting after an idle period, or another kind of "daytime state" which may occur in an industrial plant, in order to adapt the automation system to this or these states. The training is carried out on the basis of measured characteristics logged on line which may be directed into an optimization of the type described here of parameters and/or process models.

An optimal or other preferred adaptation of a mathematical and/or physical process control strategy may also be achieved by means of genetic algorithms. It is possible by means of stochastic mutation of various approaches to a solution to use these evolutionary algorithms to identify preferred or optimum parameter settings for certain process control models. In addition it is possible to add to this process by means of genetic programming. With the aid then of an evolution type of control strategy, it is possible to achieve structural improvements to the device or process control.

One or more of the sensors or actuators or other components is equipped with a wireless transmitter, and wireless communications between for example the sensor and a control unit of the industrial process may be carried out using any suitable protocol such as wireless Ethernet, ZigBee or another wireless networking or WLAN protocol. Suitable transmissions may be made using a short-range radio communication, such as a transmission conforming to a protocol compatible with any of: standards issued by the Bluetooth Special Interest Group (SIG); any variation of IEEE-802.11, WiFi, Ultra Wide Band (UWB), ZigBee or IEEE-802.15.4, IEEE-802.13 or equivalent or similar. A standard compatible with WAPI (WLAN Authentication and Privacy Infrastructure, GB15629.11-2003 or later) may advantageously be used in situations where encryption of the wireless signal is necessary or advantageous.

A radio technology working at high frequencies usually greater than 400 MHz, for example an ISM-type band (e.g. 433 MHz, 868 MHz, 2.4 GHz, 5 GHz or higher), with significant interference suppression means by spread spectrum technology or frequency hopping and so on may be a preferred type of wireless communication. For example a broad spectrum wireless protocol in which each or any data packet may be re-sent at other frequencies of a broad spectrum at around 7 times per millisecond, for example, may be used, such as in a protocol developed by ABB called Wireless interface for sensors and actuators (Wisa).

One or more microprocessors (or processors or computers) comprise a central processing unit CPU performing the steps of the methods according to one or more aspects of the invention, as described for example with reference to FIGS. 3-7. The comparator may be comprised as a processor, or it may be comprised as a standard computer or processor or other device or a dedicated analogue or digital device or on one or more specially adapted computers or processors, FPGAs (field programmable gate arrays) or ASICs (application specific integrated circuits) or other devices such as simple programmable logic devices (SPLDs), complex programmable logic devices (CPLDs), field programmable system chips (FPSCs). The method or methods, such as those described in relation to the figures, especially to FIGS. 4-7, are performed with the aid of one or more computer programs, which are stored at least in part in memory accessible by the one or more processors.

The computer program comprises computer program code elements or software code portions that make the computer, processor or other device perform the methods using equations, algorithms, recursive algorithms, wireless communications parameter data, stored values, calculations and statistical or pattern recognition methods previously described, for example in relation to FIGS. 2, 4-6. A part of the program may be stored in a processor, but also or instead in a ROM, RAM, PROM, EPROM or EEPROM chip or similar memory means. The program in part or in whole may also be stored locally (or centrally) on, or in, other suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media such as Sony memory stick (TM) and other removable flash memories, hard drives etc. may also be used. The program may also in part be supplied from a data network, including a public network such as the Internet. The computer programs described may also be arranged in part as a distributed application capable of running on several different computers or computer systems at more or less the same time.

Methods of the invention may also be practised, especially for example during a configuration phase, to examine events or to adjust set-points, or following a stoppage, or during normal operations by means of a Graphical User Interface (GUI). This is a graphical display on an operator workstation, running on a user's logged-in computer, portable computer, combined mobile phone and computing device, wearable computer or PDA etc, which may also comprise one or more text input lines or fields. Such a logged in computer may be connected directly to the control system, or connected via a main or local control server, or other control unit even such as a simple controller or PLC, or via a control system computer/workstation.

FIG. 6 shows a schematic arrangement for a such graphical user interface for displaying and/or manipulating methods according to an embodiment of the invention. The figure shows a display 60 with part of a control loop 61a, which may represent the control loops 1a of, for example, FIGS. 2 and 3. Representations of the one or more actuators 76, a system related to the control loop 71b and one or more sensors 71 may be shown which may be selected or otherwise manipulated to access information, set points etc or other data relative an actuator, system part or sensor, see FIG. 7. Parameters of wireless communication are monitored 75 in the control loop, from which information such as packet loss 63, RSSI 66, and network occupancy 67 may be selected and/or retrieved. Information may be displayed about these parameters as shown. Graphical means 68 are shown for configuring any of the MAC parameters to be sampled and logged. Also shown in the figure are graphical means 67 to select an estimator or a control strategy, such as a Kalman Filter, an optimiser, a linear optimiser, a Bayesian statistics model or other statistical model processes. A parameter sensed or read separately from the MAC layer, such as the sensor update rate 64, may also be collected for inclusion and examination with the other wireless characteristics.

Figure 5:
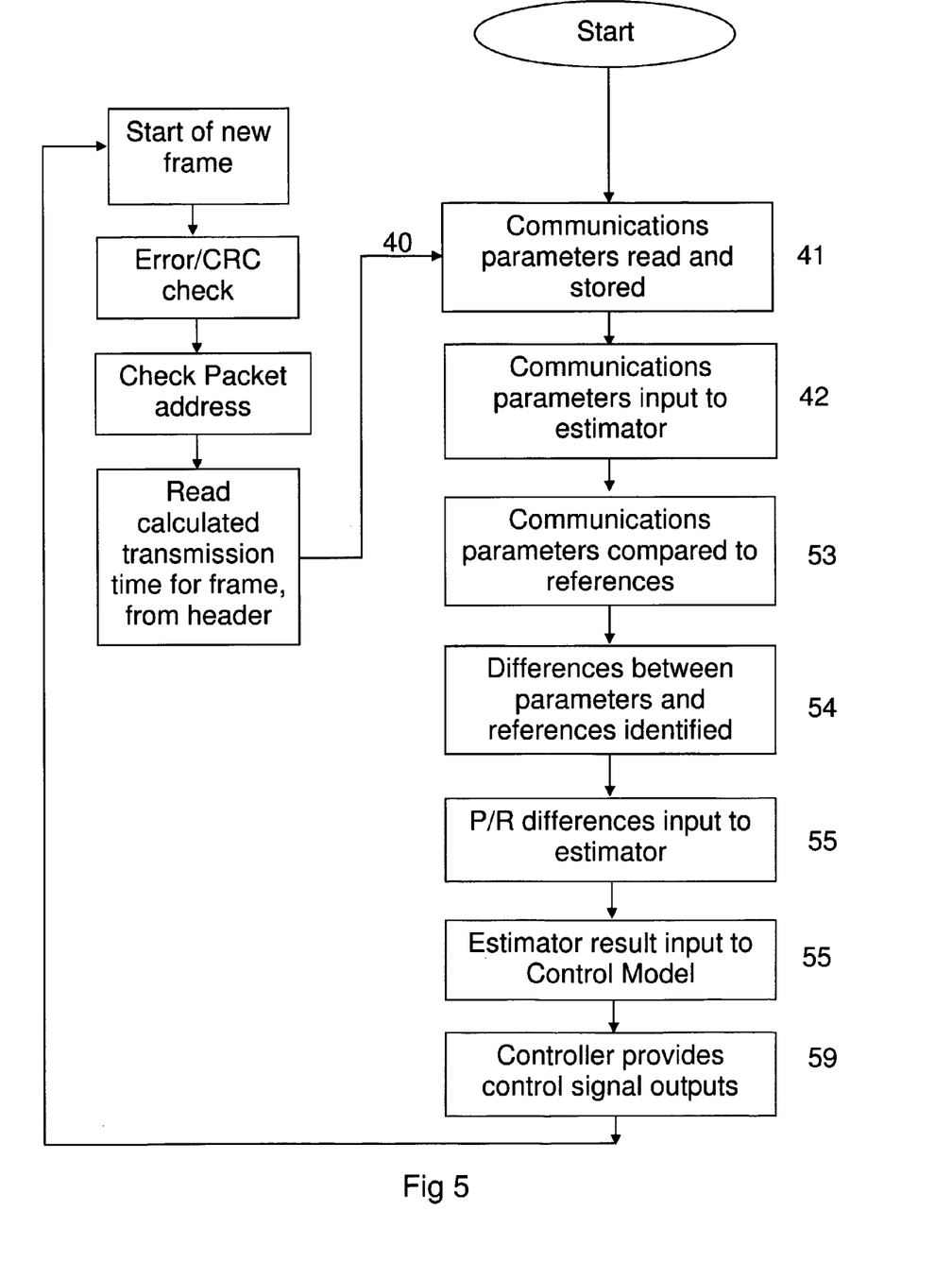
FIG. 5 is a flowchart for steps of a method for controlling an industrial automation device or process according to another embodiment of the invention.

FIG. 5 shows a flowchart for a method according to another embodiment. Communication parameters may be collected in part by logging error correction routines (CRC results), logging time delays for acceptance, rejection, logging time for answers to system checks. Wireless parameters of actively determined communication conditions as well as automatically available and logged wireless may be processed, beginning at:

40 Actively collected wireless parameters logged and read,
41 Actively collected wireless parameters and other standard or automatically logged wireless parameters read and stored,
42 Inputting active and standard communications parameters into an estimator, or recursive data processing algorithm or Kalman filter,
53 Comparing values from wireless parameters to known reference values,
54 Identifying or calculating differences between the wireless parameters and the reference values,
55 Inputting parameter/reference differences into an estimator, or recursive data processing algorithm or Kalman filter,
57 Outputting the estimator output or outputs to a control model,
59 generating, in a controller, control signal outputs.

Figure 7:
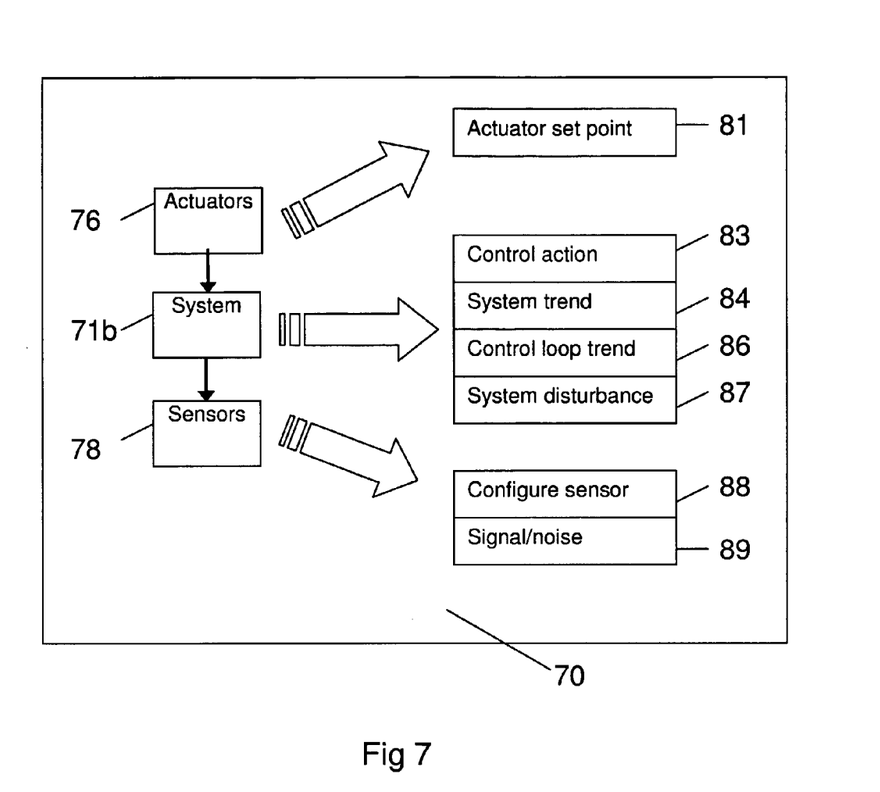
FIG. 7 shows a schematic arrangement for a graphical user interface for displaying and/or manipulating methods according to another embodiment of the invention.

FIG. 7 shows a schematic arrangement for a graphical user interface for displaying and/or manipulating methods according to another embodiment of the invention. It shows a graphical user display 70 comprising elements representing actuators 76, one or more parts of an associated system 71b, and one or more sensors 71. The GUI also comprises graphically manipulatable means 81, 83-89 to select or configure information relevant for adjustment or correction of one or more parameters control loop 1a.

The figure shows representations of the one or more actuators 76, a system 71b related to the control loop 61a and one or more sensors 71. Activating the actuators representation may provide access to set points 81, or other control loop parameters that may be corrected, or to e.g. configuration data. Activating the System representation may provide access to one or more control actions 83, data on system trends 84, data on a trend of the control loop 86, or on a system disturbance 87, any of which may also be used to correct one or more parameters of the control loop 1a. The sensor representation may provide access to a configuration function 88 and/or signal/noise ratio information.

In a yet further embodiment of the invention, the graphical user interface or other HMI may be embodied as a touch screen. In this case, text lines or images included in the display of a preferred embodiment, and means such as select estimator or input buttons, may be embodied as graphic images on a touch screen. Operation may be carried out according to the above method and as well executed by means of touching parts of the screen instead of pressing buttons, or by clicking with a computer mouse or other pointing/selection device.

One or more of the client applications of the HMI may be implemented as a thin client using a structured text document or file to present any of CIM/XML information, arguments, variables, addresses, links, mappable objects, executable applications, graphical and non-graphical components, or applets, or for example an HTML or other WWW based or HTML derivative protocol or XML protocol. The structured text document or file format takes care of handling graphical user display and activation functions of the HMI client. Activation functions refers to functions in the web page or web client display carried out by executable applications or applets which may be implemented as Java (TM), a scripting language such as JavaScript or VBScript, or similar. By means of such a thin client version of the HMI with an architecture such as described above, a user or a technician may examine status or data, configure a parameter, change set points and/or issue commands remotely in to any object for which he/she has authority to so do via the HMI interface.

It should be noted that while the above describes exemplifying embodiments of the invention, there are several variations and modifications which may be made to the disclosed solution without departing from the scope of the present invention as defined in the appended claims.

The invention claimed is:

1. A method for controlling an industrial automation device comprising a control unit, at least one actuator and at least one device arranged for wireless communication with said control unit of a process, the method comprising:
determining with a communication parameters unit at least one characteristic or communication parameter of a wireless transmission at least one of from the control unit to the industrial automation device or process and from the device, statistically processing with the communication parameters unit the at least one characteristic or communication parameter and supplying an estimated correction value to said control unit, and selecting with the control unit a control strategy dependent on the values of the at least one characteristic or communication parameter of the wireless transmission at least one of from the control unit to the industrial automation device or process and from the device.

2. The method according to claim 1, further comprising:
implementing in the control unit a control strategy dependent on an optimization of parameters of a communication channel utilizing a logical or arithmetic model or process based on any from a list of: state estimator, Kalman filter, and deductive reasoning.

3. The method according to claim 2, further comprising:
inputting information dependent on parameters of a communication channel into a neural network or for training the neural network.

4. The method according to claim 2, further comprising:
inputting information dependent on parameters of a communication channel into a process for determining a estimated value for a disturbance or an error correction based on Bayesian or Bayesian network logical or calculation model.

5. The method according to claim 1, further comprising:
comparing with the communication parameters unit the at least one characteristic to a predetermined value for the characteristic or communication parameter, statistically processing with the communication parameters unit differences between the determined characteristic or communication parameter value and a predetermined characteristic or communication parameter value, and supplying from the communication parameters unit the differences to said control unit.

6. The method according to claim 5, further comprising:
reading with the communication parameters unit from a medium access control layer any from a list of: one or more of received signal strength indication, number of failed transmission attempts, and network occupancy.

7. The method according to claim 1, further comprising:
reading with the communication parameters unit at least one of the characteristics or communication parameters from a communication layer of the wireless transmission.

8. The method according to claim 7, further comprising:
reading with the communication parameters unit at least one of the characteristics from an access control member of a communication channel.

9. The method according to claim 8, further comprising:
reading with the communication parameters unit information dependent on any from a list of: packet loss, packet transmission time delay, packet reception time delay, packet failure rate, transmission time delay variation, and reception time delay variation.

10. The method according to claim 7, further comprising:
reading with the communication parameters unit information dependent on sensed carrier characteristics from a physical layer of the wireless transmission.

11. The method according to claim 7, further comprising:
reading with the communication parameters unit information dependent on at least one transmission or reception of information containing members.

12. The method according to claim 11, wherein the information containing members comprise frames or packets.

13. The method according to claim 1, further comprising:
reading with the communication parameters unit with the communication parameters unit with the communication parameters unit at least one of the characteristics or communication parameters from a medium access control layer.

14. The method according to claim 1, further comprising:
reading with the communication parameters unit at least one of the characteristics or communication parameters from a physical layer of the wireless transmission.

15. The method according to claim 1, further comprising:
sending with the communication parameters unit a test frame transmitted by a wireless node to at least one other wireless node for scanning purposes, and reading with the communication parameters unit information from other wireless nodes or access points dependent on the test frame to obtain information about signal strength.

16. The method according to claim 15, further comprising:
reading with the communication parameters unit information from wireless nodes or access points dependent on the test frame sent, and comparing with the communication parameters unit information with a service set identifier or similar.

17. The method according to claim 1, further comprising:
reading with the communication parameters unit an update rate for a wireless sensor.

18. The method according to claim 1, further comprising:
controlling said industrial automation device at least one computer program in a computer or processor in order to carry out said method.

19. The method according to claim 1, further comprising:
controlling said industrial automation device by manipulating a graphical user interface to carry out an action according to the method.

20. A computer program product, comprising:
a non-transitory computer readable medium; and
computer program instructions recorded on the computer readable medium and executable by a computer or processor will cause the computer or processor to carry out a method for controlling an industrial automation device comprising a control unit, at least one actuator and at least one device arranged for wireless communication with said control unit of a process, the method comprising determining with a communication parameters unit at least one characteristic or communication parameter of a wireless transmission at least one of from the control unit to the industrial automation device and from the, device, statistically processing with the communication parameters unit the at least one characteristic or communication parameter and supplying an estimated correction value to said control unit, and selecting with the control unit a control strategy dependent on the values of the at least one characteristic or communication parameter of the wireless transmission at least one of from the control unit to the industrial automation device and from the device.

21. A graphical user interface for controlling an industrial automation device comprising at least one control unit, at least one actuator and at least one device arranged for wireless communication with said control unit of a process, wherein an output value from a device is determined and compared to a reference value, the graphical user interface comprising:
a graphical user interface for displaying data relevant to a part of the control loop, and a graphic user interface display or manipulation unit configured to control said industrial automation device dependent on at least one characteristic or communication parameter of at least one wireless communication at least one of from the at least one control unit to the industrial automation device and from the device.

22. The graphical user interface according to claim 21, further comprising:
a graphical user interface comprising at least one of a graphical user interface manipulation unit or a display for configuring a reference value for comparison with any of the at least one wireless communication characteristic.

23. The graphical user interface according to claim 22, further comprising:
a graphical user interface comprising at least one of a graphical user interface manipulation unit or a display for displaying a part of the control loop and a representation for at least one control loop parameter that may be corrected dependent on any of the at least one wireless communication characteristic.

24. A system for controlling an industrial automation device, comprising:
at least one control unit,
at least one actuator,
at least one device arranged for wireless communication with said control unit of a process,
a memory storage unit configured to store at least one characteristic of at least one wireless transmission, and
a statistical processor configured to determine an estimate for a control strategy dependent on any of the at least one wireless communication characteristic.

25. The system according to claim 24, further comprising:
a processor configured to compare any of the at least one characteristic to a predetermined value for at least one characteristic and calculating by at least one of a logical or arithmetic process a difference value from the at least one wireless transmission.

26. The system according to claim 24, further comprising:
a processor configured to compare any of the at least one characteristic to a predetermined value for at least one characteristic.

27. The system according to claim 24, wherein said control unit comprises a wireless communication member.

28. The system according to claim 27, wherein said at least one sensor comprises a wireless communication transmission member.

29. The system according to claim 24, wherein said at least one actuator comprises at least one wireless communication receiver.

30. The system according to claim 24, wherein the wireless communication member is arranged for wireless communication which comprises at least one physical layer and at least one medium access layer.

31. The system according to claim 24, wherein the wireless communication member is arranged for wireless communication comprising a physical layer and a medium access layer compatible with an IEEE standard 802.11, 802.15.4.

32. The system according to claim 31, wherein the wireless communication member is arranged for wireless communication comprising a logical link control layer.

33. The system according to claim 24, further comprising:
at least one computer program product configured to handle at least one characteristic of at least one wireless transmission and comprising a non-transitory computer readable medium and computer program instructions recorded on the computer readable medium and executable by a computer or processor for causing the computer or processor to carry out a method comprising determining with a communication parameters unit at least one characteristic or communication parameter of a wireless transmission at least one of from the control unit to the industrial automation device and from the device or process, statistically processing with the communication parameters unit the at least one characteristic or communication parameter and supplying an estimated correction value to said control unit, and selecting with the control unit a control strategy dependent on the values of the at least one characteristic or communication parameter of the wireless transmission at least one of from the control unit to the industrial automation device or process and from the device.

34. The system according to claim 24, wherein the memory storage unit comprises a non-volatile storage unit for data storage for storing at least one of the at least one characteristic of at least one wireless transmission or differences or information derived from the characteristics suitable for data retrieval, for use in conjunction with a control action.

35. The system according to claim 24, further comprising:
at least one display connected or connectable to the system and configured to display a graphical user interface comprising a graphical user interface for displaying data relevant to a part of the control loop, and at least one of a graphic user interface display or manipulator configured to control said industrial automation device dependent on at least one characteristic or communication parameter of at least one wireless communication.

* * * * *